United States Patent
Bank

Patent Number: 5,798,162
Date of Patent: Aug. 25, 1998

[54] COMPOSITES OF CRYSTALLINE POLYMERS

[75] Inventor: David H. Bank, Midland, Mich.

[73] Assignee: The Dow Chemical Company, Midland, Mich.

[21] Appl. No.: 697,990

[22] Filed: Sep. 4, 1996

[51] Int. Cl.$^6$ ............................................. B32B 1/00
[52] U.S. Cl. .................. 428/76; 264/172.15; 428/68; 428/212; 428/323; 428/325; 428/327; 428/373; 428/458
[58] Field of Search ................ 428/76, 68, 212, 428/323, 325, 327, 373, 458; 264/172.15; 343/912

[56] References Cited

U.S. PATENT DOCUMENTS

| | | | |
|---|---|---|---|
| 3,379,603 | 4/1968 | Barnette | 428/76 |
| 4,349,601 | 9/1982 | Brueggemann | 428/323.1 |
| 4,376,625 | 3/1983 | Eckhardt | 425/464 |
| 4,542,054 | 9/1985 | Fillmann | 428/68 |
| 4,557,558 | 12/1985 | Bresser | 350/96.23 |
| 5,093,053 | 3/1992 | Eckardt et al. | 264/45.1 |
| 5,093,054 | 3/1992 | Hirota | 264/45.1 |
| 5,236,636 | 8/1993 | Tisack | 264/22 |
| 5,415,819 | 5/1995 | Tisack | 264/22 |
| 5,486,327 | 1/1996 | Bemis et al. | 264/211.21 |

FOREIGN PATENT DOCUMENTS

| | | |
|---|---|---|
| 0 385 824 A | 9/1990 | European Pat. Off. . |
| 2 640 189 A | 6/1990 | France . |
| 2 035 838 | 6/1980 | United Kingdom . |

OTHER PUBLICATIONS

International Congress and Exposition, SAE Technical Paper Series 930088, Mar. 1–5, 1993. "Syndiotactic Polystyrene: A New Polymer for High Performance Automotive Applications", David H. Bank, et al. pp. 96–102.

*Primary Examiner*—Nasser Ahmad

[57] ABSTRACT

The present invention is a multilayered composite comprising an inner core layer of a crystalline polymer and a glass filler, and an outer skin layer of a crystalline polymer and a mineral filler wherein the outer skin layer surrounds the inner core layer.

17 Claims, No Drawings

COMPOSITES OF CRYSTALLINE POLYMERS

BACKGROUND OF THE INVENTION

This invention relates to composites of crystalline thermoplastic polymers and molder articles therefrom.

Polymer composites have been used for a variety of applications including those that require high heat and dimensional stability. Typically, thermosetting polymers are used in high heat applications, e.g. >200° C., due to their high heat resistance. However, when producing molded parts from thermosetting polymers such as epoxy resins, additional steps are needed in the finishing process, e.g. removing flash followed by postcuring, and basecoating.

Thermoplastic resins have also been used in many high heat applications due to their ability to produce molded articles which do not require postcuring or base coating. Additionally, thermoplastics have a reduced tendency to produce flash which must be removed from the molded article. Thermoplastics however, do not typically have the heat resistance and dimensional stability that can be obtained with thermosetting polymers. For example, high heat amorphous thermoplastics are known to be used in applications that require heat resistance and surface smoothness, but can be limited by inferior dimensional stability and high cost. Inorganic fillers such as glass fibers have been used to increase the heat resistance and improve dimensional stability of amorphous and crystalline thermoplastic polymers, but such systems lack surface smoothness due to the glass fibers at the surface. Other methods of utilizing thermoplastics in high heat applications include the use of heat shields to deflect the heat away from the thermoplastic material.

Therefore, it would be beneficial to obtain a thermoplastic polymeric system which produces molded parts having good dimensional stability at high temperatures and good surface smoothness but does not require removal of flash, postcuring or basecoating.

SUMMARY OF THE INVENTION

In one aspect, the present invention is a multilayered composite comprising an inner core layer of a crystalline polymer and a glass filler, and an outer skin layer of a crystalline polymer and a mineral filler wherein the outer skin layer surrounds the inner core layer.

A second aspect of the present invention is a multilayer composite comprising an inner core layer of a crystalline polymer and a glass filler, an outer skin layer of a crystalline polymer and a mineral filler, wherein the outer skin layer surrounds the inner core layer, and and an outermost metal layer adhered to the outer surface of the skin layer.

In a preferred embodiment, the present invention is a molded article comprising an inner core layer of a crystalline polymer and a glass filler, and an outer skin layer of a crystalline polymer and a mineral filler wherein the outer skin layer surrounds the inner core layer.

In another preferred embodiment, the present invention is an automotive headlamp reflector comprised of a glass filled crystalline polymer inner core layer, a mineral filled crystalline polymer outer skin layer, wherein the outer skin layer surrounds the inner core layer and a metal layer is adhered to the outer surface of the skin layer.

Molded articles made from these types of thermoplastic multilayer composites have good dimensional stability at high temperatures, good surface smoothness, do not require removal of flash, postcuring or basecoating and in many cases are more capable of competing on an economic basis with thermosetting systems.

DESCRIPTION OF THE PREFERRED EMBODIMENTS

Thermoplastic crystalline polymers are well known in the art, any of which can be sued in the multilayer composites of the present invention. Generally, the crystalline polymers used in the present invention will have a degree of crystallinity between about 10 and about 50 percent. In other words the polymer will have from about 10 to about 50 percent crystalline structure within an amorphous phase, wherein the amorphous phase makes up the balance. Typical crystalline polymers include but are not limited to syndiotactic vinylaromatic homopolymers or copolymers, polyethylene terephthalate, polybutylene terephthalate, polyphenylene sulfide, and polyamides such as nylons. Additionally, blends of crystalline polymers may also be used.

Preferably, the crystalline polymer is selected from syndiotactic vinylaromatic homopolymers, copolymers or mixtures thereof. Suitable vinyl aromatic polymers include polymers of styrene, vinyltoluene (all isomers and mixtures of isomers, but preferably p-vinyltoluene (all isomers and mixtures of isomers, but preferably p-vinyltoluene), t-butylstyrene, chlorostyrene, bromostyrene, 2,5-dimethylstyrene and mixtures thereof. Preferred syndiotactic vinylaromatic polymers are polystyrene, and copolymers of styrene and p-vinyltoluene containing from 2 to 10 weight percent p-vinyltoluene. Syndiotactic vinyl aromatic polymers may be prepared by methods well known in the art and are described in U.S. Pat. Nos. 4,680,353, 5,066,741, 5,206, 197 and 5,294,685.

As used herein, the term "syndiotactic" refers to polymers having a stereoregular structure of greater than 90 percent syndiotactic, preferably greater than 95 percent syndiotactic, of a racemic triad as determined by $^{13}C$ nuclear magnetic resonance spectroscopy.

The crystalline polymers used in the core layer and the skin layer need not be chemically identical. In other words it is possible to use two different crystalline polymers, on in each layer. However, it is preferably that both polymers have a similar coefficient of thermal expansion in order to prevent delamination. Preferably, the coefficient of thermal expansion of one polymer varies by 0 to 10 percent of the coefficient of the second polymer. It is also preferable that the two polymers be compatible such that they will bend or adhere to each other. Such compatibility can be achieved by selecting polymers which are known to be compatible with each other or by modifying one of the polymers such that it will be compatible with the other polymer chosen. For example, to compatabilize a composite system comprised of a syndiotactic polystyrene (SPS) skin and a polyamide core, on could utilize maleic anhydride modified polyphenylene oxide (MAPPO) to modify the polyamide. In this case, the polyphenylene oxide is miscible with CPS and the maleic anhydride is expected to imidize with the polyamide core, to provide a strong bond between the layers. Preferably, the polymers of the core and skin layers are the same and both are SPS.

Typically, the weight average molecular weight (Mw) of the crystalline thermoplastic polymers used is between 100, 000 and 500,000 preferably between 100,000 and 450,000, more preferably from about 200,000 and 390,000, and most preferably from about 225,000 and 350,000.

The glass filler used in the core layer of the present invention can be any glass which will increase the heat resistance and toughness of the crystalline thermoplastic polymer. Glass fillers include glass beads, flakes and fibers. Preferably the glass filler is a glass fiber, with E-glass being most preferred.

In general, glass fibers typically have a diameter of from about 9 to about 21μ. The amount of glass included in the composite of the inner core layer is typically from about 10 to about 50 weight percent based on the total weight of the crystalline polymer and the glass filler. Preferably, the composite contains from about 15 to about 40 weight percent, more preferably from about 15 to about 35 weight percent and most preferably from about 20 to 30 weight percent.

The mineral filler used in the skin layer can be any mineral filler which will reinforce the crystalline polymer while providing a smooth surface on the skin layer. Typical mineral fillers include but are not limited to talcs, clays, micas, carbides such as silicon carbide, oxides such as aluminum oxide, beryllium oxide, iron oxide, lead oxide, magnesium oxide, titanium oxide, zinc oxide, mirconium oxides, sulfates such as barium sulfate, sulfides such as molybdenum sulfide, zinc sulfide, silicates such as aluminum silicates, calcium silicates, zirconium silicates and barium titanate. Typically, glass fillers such as glass beads would not be used as a mineral filler due to the lack of high gloss in the resulting surface. Preferably, the mineral filler is a talc. The minerals used typically have a high aspect ratio, which is the ratio between the maximum dimension of the mineral particle and the thickness of the particle. Typically, the maximum dimension varies from bout 6 to about 30μ.

The amount of mineral filler used in the skin layer is typically from about 5 to about 30 weight percent based on the total weight of the crystalline polymer and the mineral filler. Preferably, the skin layer contains from about 8 to about 25 weight percent, more preferably from about 10 to about 20 and most preferably from about 15 to about 20 weight percent.

The core and skin layers are each typically from about 0.2 to about 3 mm thick, preferably from about 0.2 to about 2.0 mm, more preferably from about 0.5 to about 2.8 mm, and most preferably from about 0.5 to about 2.5 mm.

Other additives may also be included in the core and skin layers. Typical additives include antioxidants such as hindered phenols, melt processing stabilizers, adhesive promoters such as maleic anhydride modified polyphenylene oxide (MAPPO), mold release agents flame retardants, colorants and the like.

In addition, the core and skin layers may also include a rubber impact modifier. Typical rubbers include diene rubbers, ethylene propylene rubbers, ethylene propylene diene (EPDM) rubbers, acrylate rubbers, polyisoprene, and copolymers of conjugated 1,3-dienes such as butadiene, isoprene, piperylene and chloroprene with monoethylenically unsaturated monomers including isopropenyl aromatic and vinyl aromatic monomers. Rubber copolymers include block copolymers, star block copolymers and radial block copolymer rubbers. Typical amounts of rubber include from 5 to 20 weight percent based on the total weight of the layer composition.

Nucleators are typically included in crystalline polymer compositions in order to enhance the rate of crystallization. Typical nucleators include acetates, benzoates such as aluminum p-tert-butylbenzoate, sodium p-tert-butylbenzoate and sulfobenzoates of lithium, sodium and potassium as well as melamine and benzimidozole derivatives, and small particle materials such as talcs. In the case of the skin layer, the mineral filler acts both as reinforcement and as a nucleator.

When coinjecting the crystalline polymer compositions of the core and skin layers into a mold, the amounts of the fillers and the crystalline polymers used in each layer are selected such that the crystalline polymer composition of the core layer and the crystalline polymer composition of the skin layer have similar viscosities. By keeping the viscosities of both crystalline polymer compositions close to the same value a more uniform and consistent distribution is achieved of skin and core layers throughout the molded part. Generally, the viscosities of the crystalline polymer compositions should be within 25 percent of each other.

Additives and fillers can be combined with the crystalline polymers using any acceptable method. In one embodiment, additives and fillers are combined with the crystalline polymer by melt mixing using a twin screw compounding process wherein the polymer is melted and the additives and filler are uniformly distributed throughout the polymer matrix as is well known in the art. However, when combining glass fiber with the crystalline polymer of the core layer, it is preferably that the glass fiber is added to the polymer in the melt stage or in such a way that the size or length of the glass fibers are not significantly reduced.

Methods of coinjection molding articles having an inner core layer surrounded by an outer skin layer are known in the art as disclosed in U.S. Pat. No. 4,542,054 which is incorporated herein by reference. Typically, the process comprises the steps of injecting a first polymeric material into a mold cavity in a quantity sufficient to form the outer skin layer, and injecting a second polymeric material into the same cavity in a quantity sufficient to occupy the rest of its volume to form the inner core layer.

The first polymeric material injected is the crystalline polymer/mineral filler composition of the skin layer followed by the crystalline polymer/glass filler composition of the core layer, both at a temperature above the crystalline melting point of the crystalline polymer. Typically, the temperature is lower than the decomposition temperature of the crystalline polymer, yet high enough to produce a desirable flow. Preferably, the temperature is between about 270° C. and about 310° C. The pressure required to inject the crystalline polymer compositions into the mold are dependent upon the viscosity of the material at the processing temperature and the Mw of the crystalline polymer. Typically higher temperatures will be used with crystalline polymers of high Mw to lower the viscosity, thus lowering the pressure needed to fill the mold.

The mold used in the injection molding process is typically at a temperature at which the highest rate of crystallization of the thermoplastic polymer occurs. Typically, the temperature is between 100° and 150° C. At 150° C. fully crystalline components, i.e. components having about 50 percent crystallinity, are produced. At lower mold temperatures, part surfaces are quenched which results in lower surface crystallinity and high core crystallinity due to slow cooling of the core. Generally, the core layer will have a crystallinity of from about 30 to about 50 percent, preferably from about 35 to 50 percent, more preferably form about 40 to about 50 percent and most preferably from about 45 to about 50 percent. The skin layer will generally have a crystallinity of from about 20 to about 50 percent, preferably from about 25 to about 50 percent, more preferably from about 35 to 50 percent and most preferably from about 40 to 50 percent. Typically the time required to mold the thermoplastic polymer multilayer composite is very short, e.g. less than one minute.

Alternatively, an outermost metal layer is deposited on the outer surface of the skin layer. The metal layer can be applied using any acceptable technique which provides acceptable adhesion of the metal to the skin layer. Methods of applying metals to polymer surfaces are well known in the art and include vacuum metallization as described in *Polymers and Resins*, Golding, 1959, pg. 660–663, among others. Typical metals include aluminum, silver, nickel, magnesium, gold, silver, platinum, chromium, tantalum or molybdenum. Preferably, the metal layer is aluminum.

The metal layer adhered to the outer surface of the skin layer is typically applied as a very thin coating ranging from about 100 to about 500 angstroms, generally from about 100 to 400, preferably from about 100 to about 350, more preferably from about 150 to about 350 and most preferably from about 150 to about 100 angstroms.

In a preferred embodiment, the skin layer is modified such that the surface is more polar in order to increase adhesion of the metal ions to the polymer surface. On way this can be accomplished is by plasma treatment of the polymer surface. Plasma treatment of polymer surfaces is well known in the art and exemplified in U.S. Pat. No. 5,415,819, which is incorporated herein by reference. Typically, this process includes drawing a vacuum between a small bounded space between the article surface and the closely conforming mold surface, introducing an ionizable gas into the bounded space and applying an electric field to create a plasma in the bounded space to react with the article surface. Plasma treatment oxygenates the surface allowing direct bonding of metal ions to the molded part surface which produces acceptable adhesion and effectively eliminates the need for a base coat prior to metallization.

In a specific embodiment of the present invention, an automotive headlamp reflector is produced by injection molding an outer skin layer of talc filled SPS and an inner core layer of glass fiber filled SPS. The molded parts is then plasma treated, removed from the mold and coated with aluminum using a vacuum metallization process.

The composites of the present invention offer high heat resistance and dimensional stability which allows for more efficient and economical production of molded parts due to the elimination of finishing steps now practiced in commercial processes.

The following examples are provided to illustrate the present invention. The examples are not intended to limit the scope of the present invention and they should not be so interpreted. Amounts are in weight parts or weight percentages unless otherwise indicated.

EXAMPLE 1

The components of the skin layer as shown in Table 1 are melt mixed using a 40 mm Werner Pfleiderer intermeshing twin screw compounder equipped with eight barrel sections (m1–m8) having a vacuum vent in barrel 7, an opening for a twin screw side glass feeder in barrel 5, a strand die at the end of barrel 8, and a liquid addition section for a total length to diameter ratio of 34/1. The SPS and additives specified in Table 1 (except for 25% of the talc) are blended into 100 pound premix samples and fed on a mass weight control feeder into the process in the rear feed hopper of barrel 1. The remaining talc is fed into the process via a single screw feeder which meters talc feed to a transport intermeshing twin screw side feeder which conveys the talc into the process in barrel 5.

The material exits the compounding process through a die that contains eight holes measuring 3 mm in diameter which produces strands of the formulated polymer system. As the strands are produced they are cooled by dipping them in a cooling bath for a distance of about 12 inches and then air cooling from about another 8 to 12 feet. Operation in this manner allows the strands to be quenched enough to provide a strand that has enough integrity to be handled but also keeps the strand temperature hot enough to fully crystallize the polymer and allow cutting in a rotary pellitizer at strand temperatures above 100° C. Cutting the strands at or slightly above 100° C. insures that the cutting process is conducted above the glass transition temperature for SPS so that the product has more elasticity and can be cut without shattering the strand or producing excessive fines. Samples are produced at a 200 lb./hr rate.

The Core layer is produced in the same manner except that none of the glass is included in the initial melt mixture but is added via the single screw feeder.

TABLE I

|  | Core layer wt. % | Skin layer wt. % |
|---|---|---|
| Syndiotactic Polystyrene 250,000 Mw | 73.75 | 69.8 |
| Tetrakis(methylene(3,5-di-tert-butyl-4-hydroxyhydrocynanamate))(Irganox ™ 1010) | 0.35 | 0.35 |
| Bis(2,4-di-t-butyl-phenyl)pentaerythritol(Ultranox ™ 626) | 0.35 | 0.35 |
| Talc | 0.65 | 20 |
| Glass Fiber | 20 | 0 |
| Maleic anhydride modified polyphenyleneoxide (MAPPO)/SPS conc. | 4 | 4 |
| Montan Ester Wax(Hoechst Wax OP) | 0.5 | 0.5 |
| STYRENE-ETHYLENE-BUTYLENE-STYRENE TRIBLOCK ELASTOMER (KRATON ™ G1651) | 0 | 5 |
| Black Concentrate 25% carbon black in SPS | 0.4 | 0 |
| Total | 100 | 100 |

Table 2 summarizes the compounding conditions used to produce each formulation. Typical mixing times for the polymer and additives in the compounding process are in the range of 10 to 20 seconds.

TABLE 2

| Material | RPM | Melt temp. °C. | Z2 °C. | Z3 °C. | Z4 °C. | Z5 °C. | Z6 °C. | Z8 °C. | Die Temp. °C. |
|---|---|---|---|---|---|---|---|---|---|
| 30% Glass SPS | 325 | 339 | 279 | 273 | 282 | 285 | 281 | 297 | 328 |
| 20% Talc SPS | 325 | 340 | 263 | 272 | 267 | 271 | 294 | 293 | 324 |

RPM = revolutions per minute of extruder
Melt temp. = temperature of the polymer melt as it exits the extruder
Z2, Z3, Z4, Z5, Z6, Z8 = zones of the extruder as defined in Example 1
Die temp. = the temperature at which the die is set.

Co-injection molding is conducted using a Battenfeld co-injection machine fitted with a 500 ton clamping unit. The molding machine is fitted with two nonvented barrels, a "standard" Battenfeld screw design and sliding-ring chock device to aid in prevention of counter flow during the injection process.

The mold is a low profile head lamp reflector mold that incorporates optics within the reflector. The mold is configured with a cold spru bushing and a runner system. Mold temperature control is accomplished using a single-zone, hot-oil temperature controller and is about 105° C.

Pellets of the glass reinforced core material is melted in one barrel of the molding machine and pellets of the mineral filled skin material are melted in another. The skin material is injected into the mold first with sufficient volume to fill approximately 50% of the mold volume. This is followed immediately with injection of enough core material to fill the part to about 95% of its volume. Another quantity of the skin material was then injected to complete filling the part and flush the core material out of the nozzle of the molding machine thereby setting the machine up for injection of pure skin material into the next part. Once the part is filled, it is packed in the mold by application of about 400 psi hydraulic pressure. Following packing the part is allowed to cool for between 30 and 60 seconds prior to removal.

What is claimed is:

1. A multilayered composite comprising an inner core layer of a crystalline thermoplastic polymer and a glass filler, and an outer skin layer of a crystalline thermoplastic polymer and a mineral filler, wherein the outer skin layer surrounds the inner core layer.

2. The composite of claim 1 wherein the crystalline thermoplastic polymer of the core layer and the skin layer is syndiotactic polystyrene.

3. The composite of claim 2 wherein he glass filler is a glass fiber.

4. The composite of claim 3 wherein the glass fiber is from about 15 to about 40 weight percent of the core layer based on the total weight of the crystalline thermoplastic polymer and the glass fiber.

5. The composite of claim 4 wherein the mineral filler is a talc.

6. The composite of claim 5 wherein the mineral filler is from about 8 to about 25 weight percent of the skin layer based on the total weight of the crystalline thermoplastic polymer and the mineral filler.

7. A multilayer composite comprising an inner core layer of a crystalline thermoplastic polymer and a glass filler, an outer skin layer of a crystalline thermoplastic polymer and a mineral filler, wherein the outer skin layer surrounds the inner core layer, and an outermost metal layer adhered to the outer surface of the skin layer.

8. The composite of claim 7 wherein the crystalline thermoplastic polymer of the core layer and the skin layer is syndiotactic polystyrene.

9. The composite of claim 8 wherein he glass filler is a glass fiber.

10. The composite of claim 9 wherein the glass fiber is from about 15 to about 40 weight percent of the core layer based on the total weight of the crystalline thermoplastic polymer and the glass fiber.

11. The composite of claim 10 wherein the mineral filler is a talc.

12. The composite of claim 11 wherein the mineral filler is from about 8 to about 25 weight percent of the skin layer based on the total weight of the crystalline thermoplastic polymer and the mineral filler.

13. The composite of claim 12 wherein the metal is aluminum.

14. The composite of claim 6 or 13 wherein the core and skin layers are each from about 0.1 to about 3 mm thick.

15. A molded article having an inner core layer comprising a crystalline thermoplastic polymer and a glass filler, and an outer skin layer comprising a crystalline thermoplastic polymer and a mineral filler wherein the outer skin layer surrounds the inner core layer.

16. The molded article of claim 15 having an outermost metal layer deposited on the outer surface of the skin layer.

17. The molded article of claim 16 which is an automotive headlamp reflector.

* * * * *